US012099600B2

(12) United States Patent
Lunsford et al.

(10) Patent No.: US 12,099,600 B2
(45) Date of Patent: *Sep. 24, 2024

(54) BREACH RESPONSE DATA MANAGEMENT SYSTEM AND METHOD

(71) Applicant: BreachRX, Inc.

(72) Inventors: Anderson Lunsford, Vienna, VA (US); Alonzo Ellis, Malvern, PA (US); James Green, Orange, CA (US)

(73) Assignee: BreachRX, Inc., San Francisco, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/559,409

(22) Filed: Dec. 22, 2021

(65) Prior Publication Data
US 2022/0114254 A1   Apr. 14, 2022

Related U.S. Application Data

(63) Continuation of application No. 16/400,298, filed on May 1, 2019, now Pat. No. 11,244,045.

(60) Provisional application No. 62/779,835, filed on Dec. 14, 2018.

(51) Int. Cl.
*G06F 21/00* (2013.01)
*G06F 21/55* (2013.01)
*G06F 21/56* (2013.01)
*G06F 21/57* (2013.01)

(52) U.S. Cl.
CPC .......... *G06F 21/554* (2013.01); *G06F 21/568* (2013.01); *G06F 21/57* (2013.01)

(58) Field of Classification Search
CPC ....... G06F 21/554; G06F 21/568; G06F 21/57
See application file for complete search history.

(56) References Cited

U.S. PATENT DOCUMENTS

| | | | |
|---|---|---|---|
| 5,142,618 | A | 8/1992 | Fujiwara et al. |
| 5,440,723 | A | 8/1995 | Arnold et al. |
| 6,807,569 | B1 | 10/2004 | Bhimani et al. |
| 9,892,260 | B2 | 2/2018 | Kotler et al. |
| 10,192,279 | B1 | 1/2019 | Erol et al. |
| 10,439,884 | B1 * | 10/2019 | Forte ...................... G06F 21/62 |
| 10,862,906 | B2 * | 12/2020 | Sharon ................ H04L 63/1416 |

(Continued)

OTHER PUBLICATIONS

International Search Report in corresponding International Patent Application No. PCT/2019/066001, dated Mar. 12, 2020, 2 pgs.

*Primary Examiner* — Rodman Alexander Mahmoudi
(74) *Attorney, Agent, or Firm* — Young Basile Hanlon & MacFarlane, P.C.

(57) ABSTRACT

Responding to incidents includes creating a playbook of tasks based on a first document constituting an authority, such that at least some of the tasks are completed in response to incidents. A new version of the playbook is created based on differences between the first document and a second document constituting a revision of the authority. Responsive to a first incident, the new version of the playbook is used to respond to the first incident. Creating the new version of the playbook includes at least one of excluding a first task of the playbook from the new version, adding an updated task of a second task of the playbook to the new version, or adding a third task to the new version.

20 Claims, 16 Drawing Sheets

(56) References Cited

U.S. PATENT DOCUMENTS

| | | | |
|---|---|---|---|
| 2004/0054566 A1* | 3/2004 | J'Maev | G06Q 10/10 |
| | | | 705/7.23 |
| 2005/0144480 A1 | 6/2005 | Kim et al. | |
| 2010/0031358 A1 | 2/2010 | Elovici et al. | |
| 2014/0089039 A1 | 3/2014 | McClellan | |
| 2015/0188787 A1* | 7/2015 | Holland | H04L 41/50 |
| | | | 709/224 |
| 2016/0012235 A1* | 1/2016 | Lee | G06F 21/6218 |
| | | | 726/25 |
| 2017/0063917 A1 | 3/2017 | Chesla | |
| 2017/0366582 A1 | 12/2017 | Kothekar et al. | |
| 2019/0108576 A1 | 4/2019 | LaPrade et al. | |
| 2020/0145816 A1* | 5/2020 | Morin | H04W 56/001 |

* cited by examiner

Regulations

Rows Per Page: 5 ▾ | Title ▾ | Search By Column | | Add

| # | Title | Description | Guidelines/Authority | File Name | Action |
|---|---|---|---|---|---|
| 1 | NYDFS | New York Department of Financial Services Cybersecurity Requirements | New York | 2017-03-01 NYDFS.pdf | ⋮ |
| 2 | GDPR | EU General Data Protection Regulation | European Union | 2018-05 GDPR.pdf | ⋮ |
| 3 | TX521 | Identity Theft Enforcement Protection Act | Texas | 2009-09-01 Texas Data Breach Law.pdf | ⋮ |
| 4 | CA1798.82 | California Information Practices Act | California | California Data Breach Notification Law.pdf | ⋮ |

| Field | Value |
|---|---|
| Title | NYDFS |
| Description | New York Department of Financial Services Cybersecurity Requirements |
| Authority | ○ Guidelines  ● Authority |
| | New York |
| Control | NIST 800-64 ; 1SB27002 ; 1SB27001 |
| Incident Type | Third-party Loss or Theft ; Loss or Theft of Data ; Negligence ; Mistake ; Illegal Access to Systems or Information ; Loss or Theft of Equipment<br>External/Removable Media |
| Data classification | Personal Information ; Private Data ; Restricted Data |
| Event Type | Escalation |
| Country | United States |
| State | New York |
| File Uploaded | 2017-03-01 NYDFS.pdf  [Download] |

510 — pointer to dialog
512 Title
514 Authority
516 Control
518 Incident Type
520 Data classification
522 Event Type
524 Country
526 State
(File Uploaded)

Tabs: Details | Tasks

FIG. 5B

A form screenshot labeled 550 with the following fields:

- Title (552): GDPR
- Description (554): EU General Data Protection Regulation
- Authority (556): ○ Guidelines  ⦿ Authority — European Union
- Control: × NIST 800-61
- Incident Type (558): × Loss or Theft of Data | × Third-party Loss or Theft | × Negligence | × Mistake | × Illegal Access to Systems or Information
  × External/Removable Media
- Data classification (560): × Personal Information | × Health Insurance Data | × Medical Data | × Private Data | × Restricted Data
- Event Type: × Emergency
- Country (562): × United Kingdom | × France | × Spain | × Germany | × Austria | × Belgium | × Italy | × Lithuania | × Bulgaria | × Luxembourg
  × Croatia (Hrvatska) | × Cyprus | × Malta | × Czech Republic | × Netherlands Antilles | × Latvia | × Denmark | × Poland | × Estonia | × Portugal | × Finland
  × Romania | × Slovakia | × Slovenia | × Greece | × Hungary | × Sweden | × Ireland
- State (564): × Aberdeen | × Aberdeenshire | × Angus | × Armagh | × Cambridgeshire | × Bedfordshire | × Netherlands Antilles | × Berkshire | × Cheshire | × Birmingham | × Co Fermanagh
  × Buckinghamshire | × Cambridge | × Hungary | × Sweden | × Ireland | × Bridgend | × Bristol
  × Cornwall | × Northern Ireland | × Macedonia | × Hamburg | × Northern | × Charted Islands | × Cleveland | × No-Gloucose | × Paris | × London
- File Uploaded (566): 2018 es GDPR.pdf Tabs: Details | Tasks (568)

Button: ⬇ Download

View My Incident

| # | Task Name | Description | Status | Actions |
|---|---|---|---|---|
| 1 | 7.5.2 Documentation Requirements | When creating and updating documented information the organization shall ensure appropriate (1) identification and description, (2) format and media and (3) reviews and approval for suitability and adequacy | ▓▓ | ... Accept View |
| 2 | 7.5.3a Documentation Requirements | Documented information required by the information security management system shall be controlled to ensure it is available and suitable for use, where and when it is needed | ▓▓ | ... |
| 3 | 7.5.3b Documentation Requirements | Documented information required by the information security management system shall be controlled to ensure it is adequately protected (e.g. from loss of confidentiality, improper use, or loss of integrity) | ▓▓ | ... |
| 4 | 7.5.3c Documentation Requirements | Documented information required by the information security management system shall be controlled to ensure distribution, access, retrieval and use are addressed | ▓▓ | ... |
| 5 | 7.5.3d Documentation Requirements | Documented information required by the information security management system shall be controlled to ensure storage and preservation, including the preservation of legibility are addressed | ▓▓ | ... |

Start Date: 02-26-2019
Planned End Date: MM-DD-YYYY
Planned Amount ($):

FIG. 11

Add Incident

| | |
|---|---|
| Incident Name | MPH Test Incident |
| Description | MPH Test Incident |
| Incident Type — 1302 | × Negligence |
| Data Classification — 1304 | × Personal Information |
| Event Type — 1306 | × Emergency |
| Country — 1308 | × Afghanistan |
| State — 1310 | × Badakhshan |
| Tasks — 1312 | ISO Task |
| Created By | Adonzzo Ellis |

Submit   Cancel

BREACH RESPONSE DATA MANAGEMENT SYSTEM AND METHOD

CROSS-REFERENCE TO RELATED APPLICATION(S)

This application is a continuation of U.S. patent application Ser. No. 16/400,298, filed May 1, 2019, which claims priority to and the benefit of U.S. Provisional Application Patent Ser. No. 62/779,835, filed Dec. 14, 2018, the entire disclosures of which are hereby incorporated by reference.

TECHNICAL FIELD

This disclosure relates to, in general, data and system security and more specifically to managing and responding to data breaches and cyber security events.

BACKGROUND

Computing environments, devices, infrastructures, and systems (collectively "systems") are frequently subject to adverse cyber events (or simply cyber events or incidents). Such cyber events may include malware, phishing, man-in-the-middle, denial-of-service, SQL injection, and the like attacks. At least some such cyber events can result in data breaches due to the unauthorized access and/or disclosure of sensitive, confidential or otherwise protected data. Such data breaches may involve personal health information (PHI), personally identifiable information (PII), trade secrets, or intellectual property. A 2018 Cost of Data Breach Study found that the average total cost to a company of a data breach is $148 per stolen record. The report is accessible at https://www.ibm.com/security/data-breach. Additionally, news stories of cyber hacking and electronic espionage abound. Furthermore, at least some such cyber events may compromise system integrity resulting in significant productivity losses and degraded customer service.

Furthermore, some enterprises (e.g., financial institutions, heath care providers, companies that manage certain user information and that operate in certain jurisdictions) may be subject to regulatory mitigation, controls, and reporting obligations.

Incident threat mitigation involves preventing, collecting, interpreting, analyzing, and acting upon complex data in many forms. This data can describe the attacker, the target user, a system, data, an application, programs, code, communication methods, networks, as well as many other aspects of the computing environment or business operation.

Effective security response management (e.g., response to cyber events) is critical. Effectively detecting system vulnerabilities and anticipating, mitigating, capturing, recording, investigating, acting upon, and responding to security incidents is critical.

SUMMARY

Disclosed herein are implementations of security incident response management.

A first aspect is a method that includes creating a playbook of tasks based on a first document constituting an authority, such that at least some of the tasks are completed in response to incidents; creating a new version of the playbook based on differences between the first document and a second document constituting a revision of the authority; and, responsive to a first incident, using the new version of the playbook to respond to the first incident. Creating the new version of the playbook includes at least one of excluding a first task of the playbook from the new version, adding an updated task of a second task of the playbook to the new version, or adding a third task to the new version.

A second aspect is a device that includes a memory and a processor. The processor is configured to execute instructions stored in the memory to identify differences between a first document and a second document, where the first document constitutes an authority and the second document constitutes a revision of the authority; create a new version of a playbook based on differences between the first document and the second document, where the playbook corresponds to the first document and has a first effective date and the new version has a second effective date; and, responsive to receiving an incident before the second effective date and after creating the new version of the playbook, use the playbook to respond to the incident. To create the new version of the playbook includes at least one exclude a first task of the playbook from the new version of the playbook, add an updated task of a second task of the playbook to the new version, or add a third task to the new version.

A third aspect is a non-transitory computer readable medium that stores instructions operable to cause one or more processors to perform operations that include identifying differences between a first document and a second document, the first document constituting an authority and the second document constituting a revision of the authority; creating a new version of a playbook based on differences between the first document and the second document, where the playbook corresponds to the first document and has a first effective date, and where the new version of the playbook corresponds to the second document and has a second effective date that is later than the first effective date; and responsive to receiving an incident after the second effective date, using the new version of the playbook to respond to the incident.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is an illustration of a user interface of regulations according to implementations of this disclosure.

FIGS. 5A-5B are illustrations of user interfaces of details of regulations of FIG. 4 according to implementations of this disclosure.

FIGS. 7A-7B are illustrations of user interfaces of details of other authorities according to implementations of this disclosure.

FIG. 11 is an illustration of a user interface of pending tasks according to implementations of this disclosure.

FIGS. 13A-13B are illustrations of user interfaces for creating incidents according to implementations of this disclosure.

DETAILED DESCRIPTION

As mentioned above, effective management and response to cyber events is critical. Systems and techniques according to this disclosure can provide effective security response management by enabling security practitioners to effectively anticipate, prevent, mitigate, capture, record, investigate, act upon, respond to, and/or report on security events. The security practitioners can include, for example, legal (e.g., inside and/or outside counsel), compliance, cyber security or computer forensic, IT, managerial, or other personnel. Such systems and techniques enable the tracking of incidents (e.g., cyber events) throughout their life cycles, while continuously keeping an audit trail, sharing knowledge, building learnings, and/or, if required, ensuring regulatory compliance.

Systems and techniques according to this disclosure can enable effective security event (i.e., incident) response. Such systems can learn, aggregate knowledge, share insights, aid investigation, and manage the complete lifecycle of a security event; and facilitate a well-informed response management by integrating, among other information, context-based intelligence feeds (referred to herein as "intel feeds"), integrating relevant controls, and mapping such controls to laws and/or regulations.

Incident investigation can involve collecting, interpreting, analyzing, and acting upon complex data in many forms. These data can describe the attacker, the target user(s), the system(s), the data, the application(s) or program(s), the communication methods, the networks, as well as many other aspects of the computing environment or business operation. Detecting system and/or procedural vulnerabilities and anticipating, mitigating, capturing, recording, investigating, acting upon, and responding to security incidents are referred to as incident management or cyber event management.

To describe some implementations in greater detail, reference is first made to examples of hardware structures.

Figure 1:
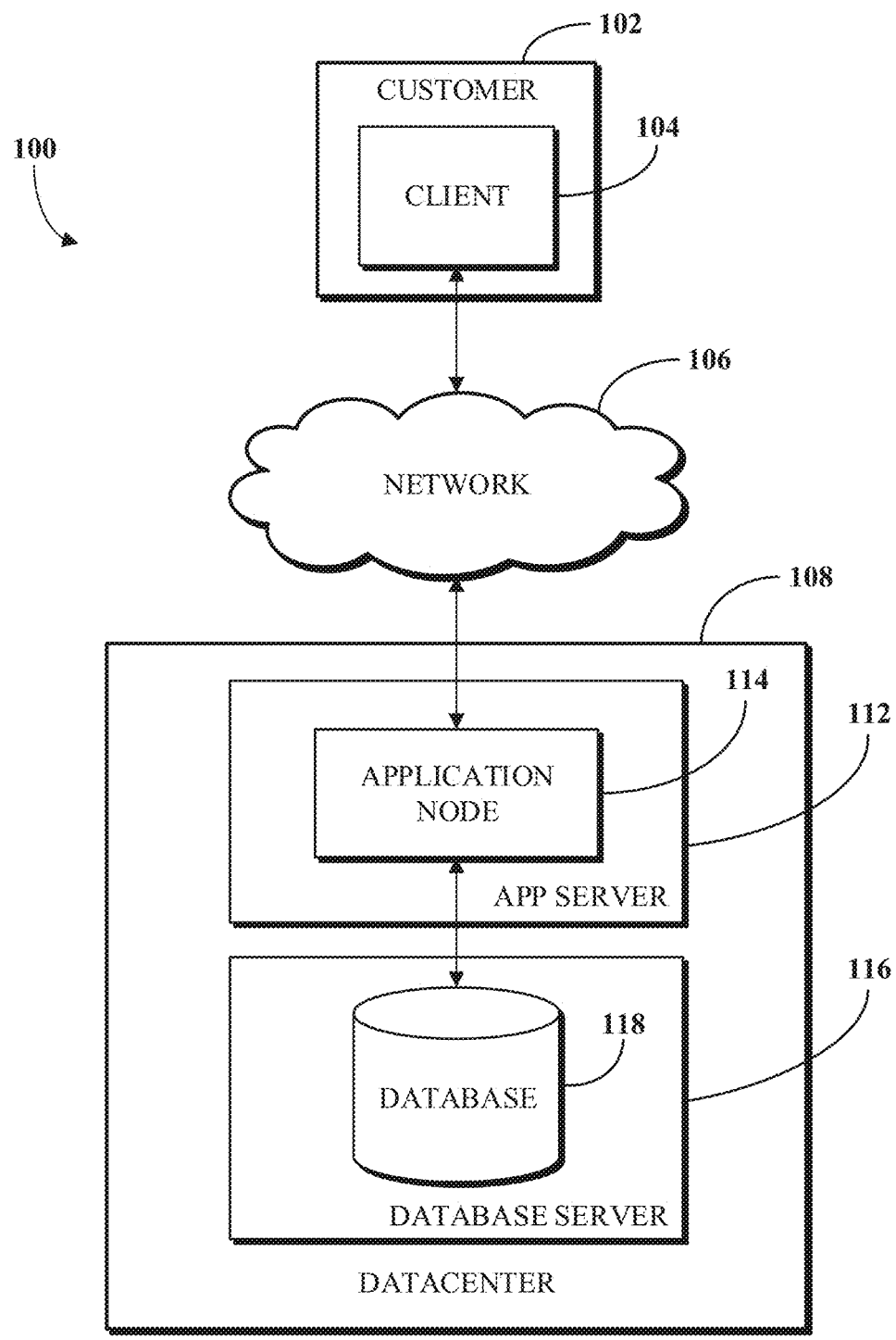
FIG. 1 is a block diagram of an example of a computing environment for incident management according to implementations of this disclosure.

FIG. 1 is a block diagram of an example of a computing environment for incident management (i.e., a system 100) according to implementations of this disclosure. As used herein, the term "computing environment for incident management," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a platform-as-a-service (PaaS) provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or a combination of physical units. In some implementations, a single physical unit can include multiple clients.

The client 104 can be an instance of an application running on a customer device associated with the customer 102. As used herein, the term "application" can include, but is not limited to, applications, programs, instances, processes, threads, services, plugins, patches, application version upgrades, or any other identifiable computing unit capable of accessing or interacting, directly or indirectly, with a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. The datacenter 108 can be a cloud server provider. In an example, and without limitation, the datacenter 108, as generally illustrated, includes an application server 112 and a database server 116. The system 100 can include any number of datacenters and servers or can include a configuration of datacenters and servers different from that generally illustrated in FIG. 1.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer (not shown) for routing traffic from the network 106 to various servers associated with the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database. While limited examples are described, the database 118 can be configured as or comprise any suitable database type. Further, the system 100 can include one, two, three, or any suitable number of databases configured as or comprising any suitable database type or combination thereof.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

Figure 2:
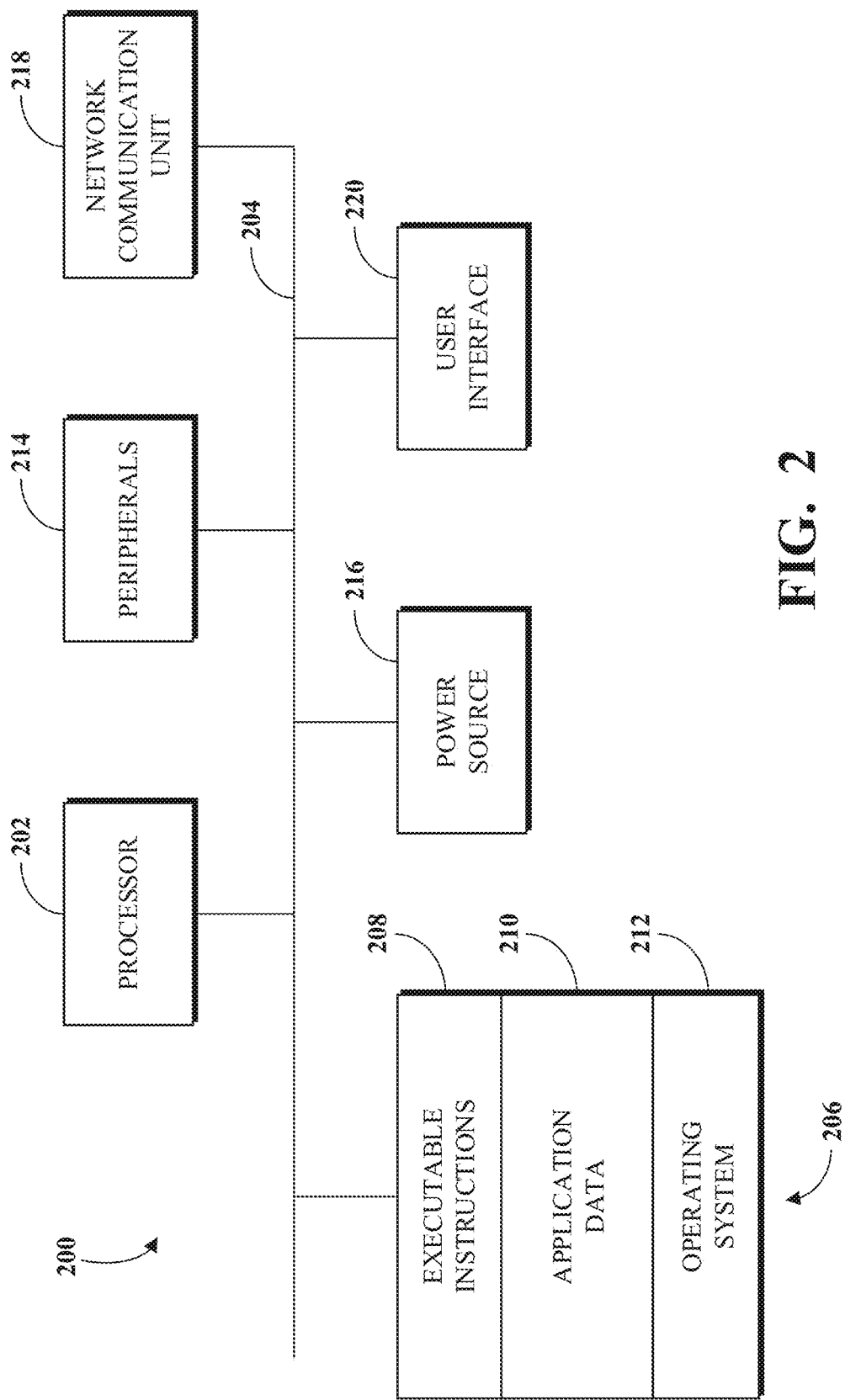
FIG. 2 is a block diagram of an example internal configuration of a computing device of the computing environment for incident management shown in FIG. 1.

FIG. 2 generally illustrates a block diagram of an example internal configuration of a computing device 200, such as a client 104 or a server, such as an application server 112 or a database server 116, of the system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now-existing or hereafter developed, capable of storing data or instructions for processing by the processor 202. The processor 202 can access or manipulate data in the memory 206 via the bus 204. Although depicted here as a single bus, the bus 204 can be composed of multiple buses, which can be connected to one another through various bridges, controllers, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to manage cyber events as described herein. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, Linux®, RIOT, or VxWorks; an operating system for a small device, such as a smartphone or tablet device; an operating system for a large device, such as a mainframe computer; or a derivative of the aforementioned operating systems. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, (e.g., an OLED display), or other suitable display.

Figure 3:
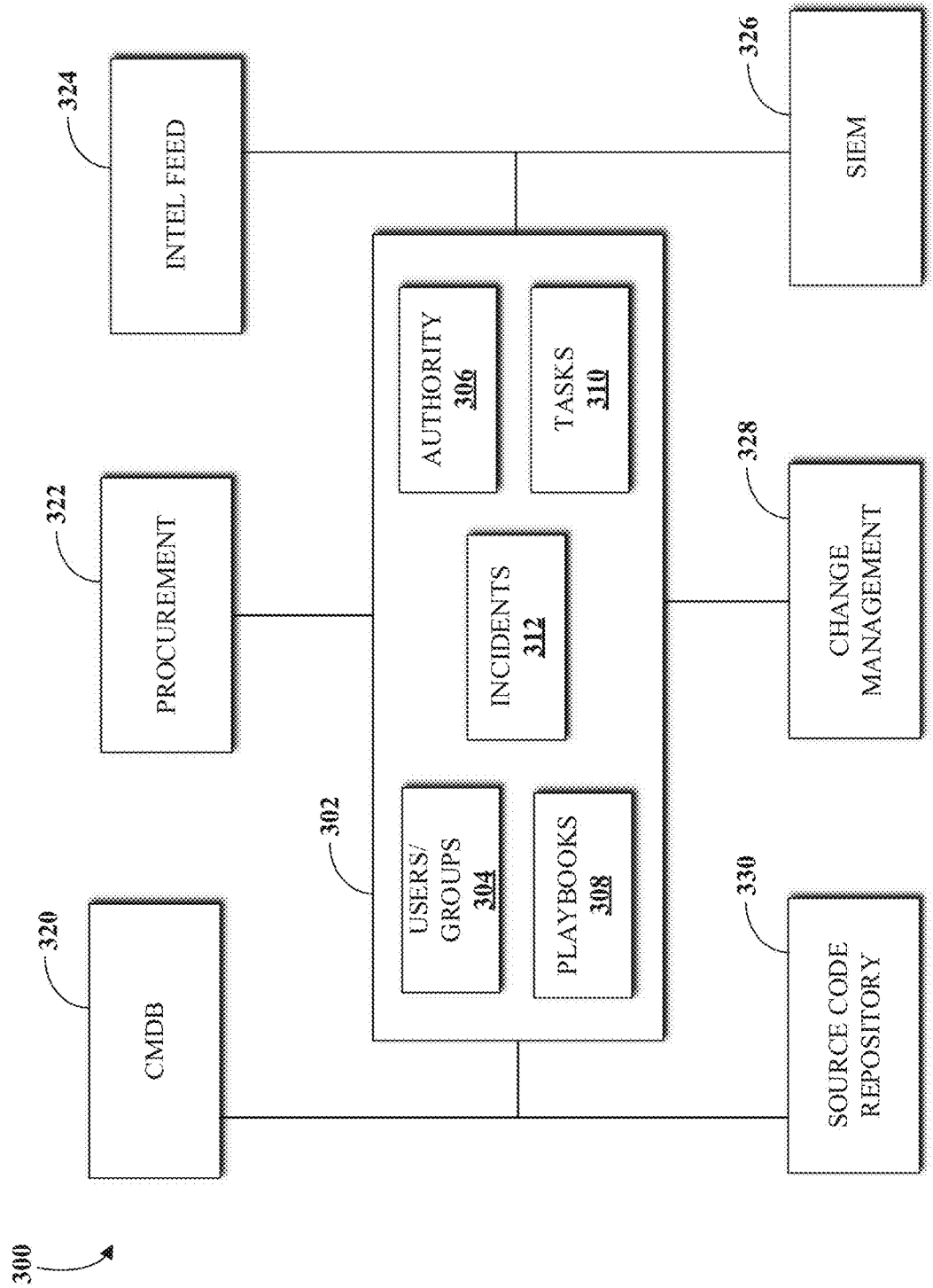
FIG. 3 is a block diagram of an example of a cyber event response management system according to implementations of this disclosure.

FIG. 3 is a block diagram of an example 300 of a cyber event response management system according to implementations of this disclosure. The example 300 includes a system 302. The system 302 can be employed (e.g., used) by an enterprise (which may be a regulated enterprise, a private entity, a public entity, a governmental agency, a small entity, a large entity, etc.) to continually assess the assets of the enterprise for potential cyber events or vulnerabilities, predict cyber events associated with such assets, respond to a cyber event that has occurred with respect to one such asset, or a combination thereof.

The assets can be computing assets. The computing assets can be hardware, software, telecommunications, or other types of computing assets and/or configurations thereof. Non-limiting examples of computing assets include a Dell server, an Oracle database system, a Tomcat server, and an Apache web server. Non-limiting examples of asset configurations include that the physical server is assigned the IP address 192.168.1.1 and that the server runs the Red Hat Enterprise 6.8, that the Oracle database is configured with 3DES168 encryption, that the Tomcat server AJP port is set to 8100, and that the Apache web server is configured to only accept GET, POST, and HEAD request types.

To aid in the understanding of this disclosure, examples of data and user interfaces are used for illustrative purposes only. The teachings herein are not limited to any specific user interfaces, attributes, task types, classifications types, or other data types described herein. The system 302 is described with reference to an enterprise (referred to also as an "instant enterprise"). For example, the system 302 can be considered to be configured with the regulations that apply to the instant enterprise, all the controls (e.g., the IT controls) that apply to or instituted/adopted by the instant enterprise, all the policies that apply to the instant enterprise, relevant contracts that apply to the instant enterprise, other authorities, or a combination thereof. Each of the applicable authorities can be configured with associated tasks.

The system 302 includes a users/groups module 304, an authority module 306, a playbooks module 308, a tasks module 310, and an incidents module 312. The system 302 can include additional or fewer modules. Each of the modules 304-312 can include additional modules and/or the functionality of each of the modules 304-312 can be implemented by submodules. The system 302 can be the application server 112 of FIG. 1. The modules 304-312 can be modules of one or more of the application node 114. The system 302 can be the computing device 200 of FIG. 2. The modules 304-312 can be at least some of the executable instructions 208 of FIG. 2. In the following description, statements that refer to the system 302 as performing an action or a step are to be understood as the action or the step is performed by the system 302, or a module thereof.

The users/groups module 304 provides for the management of users and user groups that participate, to some extent, in the management of cyber events for the instant enterprise. Via the users/groups module 304, users can be assigned permissions and/or responsibilities. Users can be assigned to user groups. Tasks related to cyber events can be assigned to user groups, individual users, roles, or automated agents. For example, a task can be assigned to the Compliance group. For example, a task can be assigned to the user "Jack Bright." For example, a task can be assigned to the role "CFO." For example, a task can be assigned to a system (i.e., automated) agent (e.g., a programmed set of instructions that are executable by a processor to accomplish a task). In some situations, an automated agent may not be assigned to a user group. Nevertheless, the automated agent may be referred to as being a member of a user group. For simplicity of reference, and unless otherwise indicated, a user group, a user, a role, or a system agent, are referred to collectively as "user group" or "group."

As further described below, when a task is assigned to a user group, any user of that user group can accept and/or complete the task. Said another way, the responsibility for completing certain tasks can be delegated to certain groups.

As such, only users of the delegated group can complete the task. For example, a task "Mid-year review of GDPR compliance procedures" may be assigned the Compliance group; and a task "Review permissions of all users of the PatientBase system" may be assigned to the administrators user group. When a task related to a cyber event is instantiated, the system 302, or the users/groups module 304, determines, based on attributes of the task, which user group(s) and/or which user(s), the task is to be assigned to (e.g., who can view and/or complete the task). In some implementations, users who are not members of the delegation group can view the task (e.g., can view but cannot modify the details of the task).

The enterprise may be subject to laws and associated regulations; may have contracts with subcontractors, prime contractors, vendors, customers, or the like; may have its own internal policies; or may have defined controls, such as information technology (IT) controls, procedural controls, and so on. Each such law, regulation, contract, IT control, or policy is referred to herein as "an authority." Such authorities may impose or define requirements related to cyber events. Such requirements can be preventive requirements, configuration requirements, reporting requirements, or other types of requirements.

Such requirements can be codified using the authority module 306. The codification of the requirements determines/establishes what the enterprise is required to do (for example, under at least one authority) to identify and remediate risks, and manage the response process if a cyber event (e.g., a breach) occurs. For example, a set of tasks can be associated with a codified requirement. In some implementations, the set of tasks can be referred to as a playbook or an incident response. The codifying (examples of which are further provided below) can be performed iteratively and/or over an extended period of time. The codification process can be an automated process, a manual process, or a combination thereof.

As mentioned above, the enterprise can have its own controls (such as IT controls) that are designed to ensure that the enterprise's assets (or configurations thereof) and/or procedures are such that cyber events can be avoided, detected, and/or properly responded to. The controls can include preventative controls, detective controls, technical controls, compliance controls, fewer, more, other types of controls, or a combination thereof. A preventative control may be intended to prevent an incident (i.e., a cyber event) from occurring. A detective control may be intended to identify and characterize an incident that may be in progress (i.e., a cyber event that has occurred and is not yet resolved). A technical control may be intended to uncover illegal accesses to an asset of the enterprise. Illegal accesses can be due, for example, to improper user authentication and access control permissions to systems and data within such systems, improper configurations of firewall parameters thereby allowing an actor from outside the instant enterprise to access resources within the instant enterprise. A compliance control can ensure compliance with controls that may be mandated by, for example, privacy laws, policies, and the like.

The enterprise can have policies that define, for example, respective courses of action or procedures related to cyber event (e.g., incident) management. The enterprise may define many types of policies. For example, the enterprise may establish an IT Security Incident Response Policy that defines the responsibilities of a person who reports a security incident (e.g., a cyber event). For example, the enterprise may establish an Information Security Incident Management Policy, which may define the governance and accountability for information security management. For example, the enterprise may establish Critical Incident Management Policies, which may define the development, implementation, and annual review of Critical Incident Management Procedures.

As mentioned, the instant enterprise may be subject to laws and regulations. Such laws and regulations may require the enterprise to institute specific controls to protect certain information types (e.g., PII, PHI, etc.), to process and manage such data in specific ways, and may mandate reporting requirements in cases of cyber events.

The tasks module 310 can be used to manage tasks associated with cyber events. For example, the tasks module 310 can be used to create tasks, which includes assigning tasks to one or more user groups. When an incident is created in the system 302, the tasks module 310 can be used to assign tasks, which are necessary for resolving the incident, to respective user groups. The playbook module 308 can be used to collect a set of tasks into a playbook. A playbook can provide a recipe (e.g., a pre-configured or prespecified set of tasks) for responding to specific incident types. More generally, a playbook can be any collection of tasks. For example, a playbook can be associated with an authority. For example, the collection of tasks that is associated with the GDPR can be referred as a playbook. The tasks of a playbook for responding to an incident can be assembled (e.g., collected, derived) from the tasks of other playbooks. For example, based on the parameters (i.e., attribute values) of an incident, the appropriate (e.g., relevant, related, etc.) tasks from other playbooks can be associated with the tasks for resolving the incident.

The incidents module 312 can be used to manage cyber events. For example, via the incidents module 312, incidents can be created, modified, and resolved. The incidents module 312 can provide mechanisms, such as user interfaces or programmatic interfaces (e.g., APIs) for the creation of incidents. Workflows and states may be associated with different incidents types (for example, based on attribute values of the incidents). The incidents module 312 can be used to shepherd an incident through its associated workflow. The incidents module can be used to ensure that an incident does not advance to a next state in its lifecycle unless certain specified criteria (e.g., gate criteria) are met.

FIG. 4 is an illustration of a user interface of regulations 400 according to implementations of this disclosure. While the regulations 400 are shown in a user interface, it is to be understood that data elements (e.g., records, fields, etc.) associated with each of the displayed regulations (or any data presented in any user interface of this disclosure for that matter) can be stored and managed by the system 302, such as in a database, which can be the database 118 of FIG. 1. In an example, the user interface of regulations 400 can be presented (e.g., generated and managed by) the authority module 306. The regulations 400 shows that the enterprise is subject to four regulations including a regulation 402 and a regulation 404.

The regulation 402 is the New York State Department of Financial Services (NYDFS). The NYDFS is a set of regulations that places cybersecurity requirements on some financial institutions. The stated purpose of the NYDFS is the ensuring a safe and sound financial services marketplace. The requirements imposed by the NYDFS include the encryption of sensitive data, yearly certification of compliance with the regulation, employment of multi-factor authentication, documenting and reporting of cyber security events, and monitoring and limiting the access privileges (e.g., permissions) of users.

The regulation 404 is the General Data Protection Regulation (GDPR). The GDPR imposes requirements on controllers and processors of personal data. According to GDPR, personal data means "any information relating to an identifiable person who can be directly or indirectly identified in particular by reference to an identifier." A controller is an entity that determines the purposes, conditions and means of the processing of personal data. A processor is an entity, such as a cloud provider, which processes personal data on behalf of the controller. The GDPR, among other requirements, relates to notification policies of companies that have been breached. For example, data breaches, which may pose a risk to individuals, must be notified to the regulators within 72 hours and to affected individuals without undue delay.

FIGS. 5A-5B are illustrations of user interfaces of details of regulations of FIG. 4 according to implementations of this disclosure. A user interface 510 of FIG. 5A and a user interface 550 of FIG. 5B show, respectively, additional data (e.g., attributes) associated with (e.g., defining), respectively, the regulation 402 (i.e., the NYDFS) and the regulation 404 (i.e., the GDPR) of FIG. 4. More, fewer, or other attributes can be associated with a regulation.

The user interface 510 of FIG. 5A shows that the NYDFS regulation has attributes 512-526. The user interface 550 of FIG. 5B shows that the GDPR regulation has attributes 552-566. Each of the attributes 512-526 and 552-566 has a corresponding attribute value. The attribute values can be set during codification of the regulation into the system 302.

The attribute 512 can define the jurisdictional authority that issued the regulation, which is the state of New York in the case of NYDFS.

The attribute 514 defines the controls, if any, that may be implicated by and/or are compliant with the regulation. For example, the NYDFS (i.e., Section 500.16 Incident Response Plan) states that enterprises "shall establish a written incident response plan designed to promptly respond to, and recover from, any Cybersecurity Event materially affecting the confidentiality, integrity or availability of the [enterprise]'s Information Systems or the continuing functionality of any aspect of the Covered Entity's business or operations." One such industry best practice of a written incident response plan is defined by the National Institute of Standards and Technology (NIST) publication 800-61, titled "Computer Security Incident Handling Guide." As the instant enterprise has adopted the NIST 800-61 as a control, the user interface 510 illustrates that the NIST 800-61 is a control that is related to the regulation 402 (i.e., the NYDFS).

The attribute 516 can specify the types of incidents (e.g., cyber events) that the NYDFS regulation covers (e.g., is concerned with, inferred to be concerned with, etc.). The incident types that are listed in the attribute 516 can be defined by the instant enterprise. That is, the instant enterprise can define the semantics of the incident types. The incident types of the attribute 516 can be or can be related to incident types that are covered by the NYDFS regulation. The attribute 516 shows that the NYDFS is concerned with cyber events that are of type "Third-party Loss of Theft," "Loss of Theft of Data," "Negligence," "Mistake," "Illegal Access to Systems or Information," "Loss or Theft of Equipment," and "External/Removable Media," as these incident types are defined by the instant enterprise.

The attribute 518 can specify the types of data that the NYDFS regulation covers (e.g., is concerned with, inferred to be concerned with, etc.). The data classifications that are listed in the attribute 518 can be defined by the instant enterprise. That is, the instant enterprise can define the semantics of the different data classifications. The data classifications of the attribute 518 can be or can be related to data types that are covered by the NYDFS regulation. The attribute 518 shows that the NYDFS is concerned with data that are of type "Personal Information," "Private Data," and "Restricted Data," as these data classifications are defined by the instant enterprise.

The attribute 520 (i.e., event type) can be used to select the user groups assigned (e.g., such as to respond) to an event. For example, an event type of "Low Level" may be assigned only to the IT group. For example, an event type of "Critical" may be assigned to, among others, the legal counsel group. The attribute 520 can be used in combination with other attributes to select (such by the system 302) the assigned groups to an event. The attribute 520, alone or in combination with other attributes, can ensure that the required groups (i.e., members of the groups) are notified in real-time when tasks are assigned to those groups.

The attribute 522 can define the country (or countries) where the regulation is applicable and the attribute 524 can define the state (or states) where the regulation is applicable. The value of the attribute 522 is the "United States" and the value of the attribute 524 is "New York." The attribute 526 shows any documentation that are relevant to the regulation. The attribute 526 shows that the text of the regulation itself is attached.

With respect to FIG. 5B, the attribute 552 (which is similar to the attribute 512 of FIG. 5A) can define the jurisdictional authority that issued the GDPR regulation, namely the European Union.

The attribute 554 (which is similar to the attribute 514 of FIG. 5A) defines the controls, if any, that may be implicated by the regulation. As the instant enterprise has adopted the NIST 800-61 as a control, the user interface 550 illustrates that the NIST 800-61 is a control that is related to the regulation 404 (i.e., the GDPR).

The attribute 556 (which is similar to the attribute 516 of FIG. 5A) shows that the GDPR is concerned with cyber events that are of type "Loss of Theft of Data," "Third-party Loss of Theft," "Negligence," "Mistake," "Illegal Access to Systems or Information," "Loss or Theft of Equipment," and "External/Removable Media," as these incident types are defined by the instant enterprise.

The attribute 558 (which is similar to the attribute 518 of FIG. 5A) shows that the GDPR is concerned with data that are of type "Personal Information," "Health Insurance Data, "Medical Data," "Private Data," and "Restricted Data," as these data classifications are defined by the instant enterprise.

The attribute 560 (which is similar to the attribute 520 of FIG. 5A) shows that the event type is set to "Emergency."

The attribute 562 (which is similar to the attribute 522 of FIG. 5A) lists the GDPR signatory states, namely the "United Kingdom," France," "Spain," "Germany," "Austria," "Belgium," "Italy," "Latvia," "Lithuania," "Bulgaria, "Luxembourg," "Croatia," "Cyprus," "Malta," the "Czech Republic," the "Netherlands Antilles," "Denmark," "Poland," "Estonia," "Portugal," "Finland," "Romania," "Slovakia," "Greece," "Hungary," "Sweden," and "Ireland." The attribute 564 (which is similar to the attribute 524 of FIG. 5A) lists the states of the countries of the attribute 562.

The attribute 562 (which is similar to the attribute 526 of FIG. 5A) includes an attached document that is the text of GDPR regulation.

As mentioned above, an authority (a contract, a regulation, a control, etc.) can be codified into the system 302. A user interface control 568 can be used to show the tasks that are codified for an authority. In the case of FIG. 5B, the user interface control 568 can be used to show the tasks that are codified for the regulation 404 of FIG. 4. As mentioned above, the tasks that are codified for an authority can be referred to as the playbook for the authority.

Figure 6:
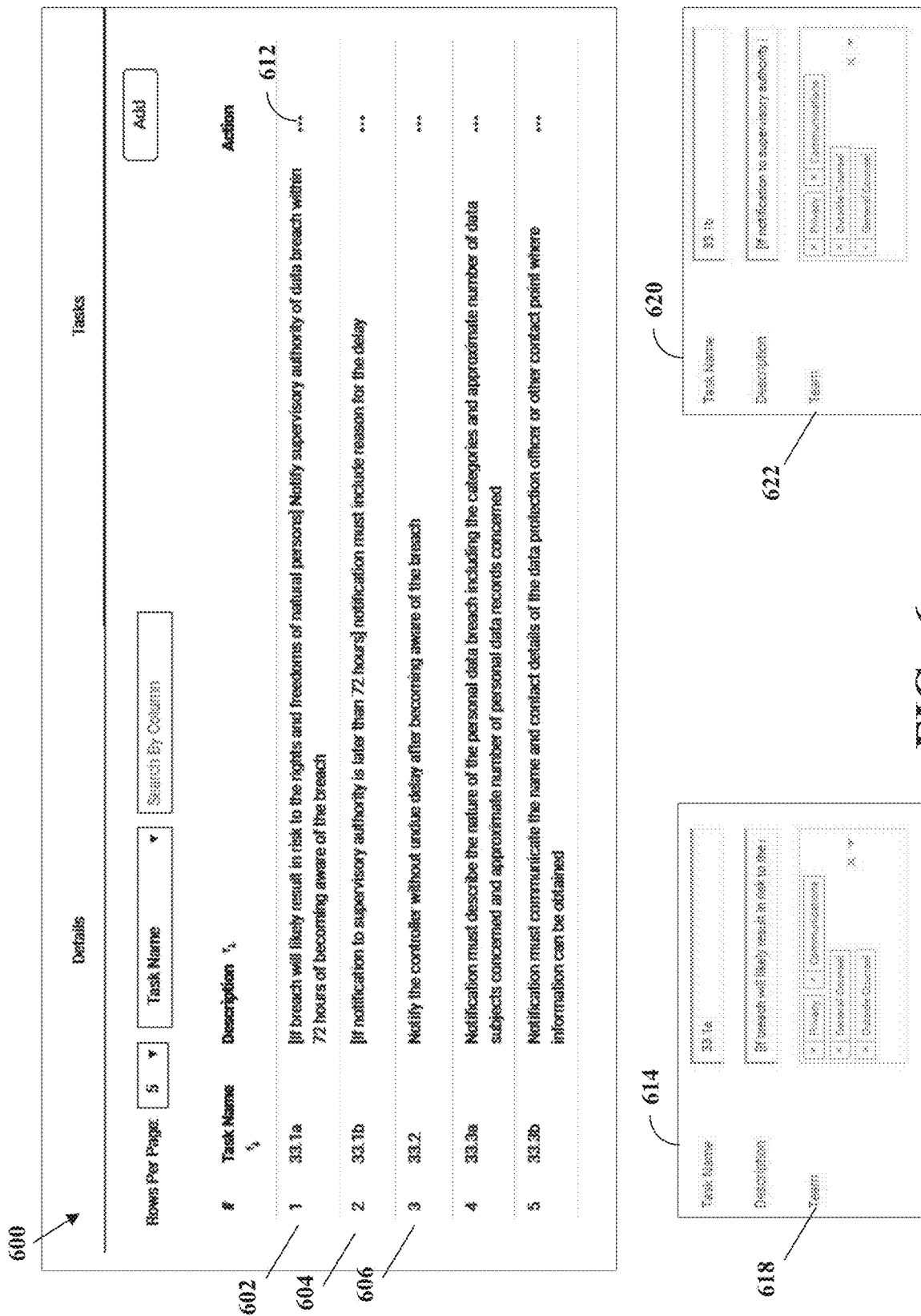
FIG. 6 is an illustration of a user interface of a listing tasks associated with an authority according to implementations of this disclosure.

FIG. 6 is an illustration of a user interface of a listing 600 tasks associated with an authority according to implementations of this disclosure. The listing 600 can be displayed in response to initiating (e.g., pressing, selecting, invoking, etc.) the user interface control 568 of FIG. 5B. The listing 600 includes tasks 602-606.

As mentioned, the tasks of the listing 600 includes the codification of at least some parts of the authority. In an example, the Article 33 of the GDPR (titled "Notification of a personal data breach to the supervisory authority") mandates, in part, the following:

1. In the case of a personal data breach, the controller shall without undue delay and, where feasible, not later than 72 hours after having become aware of it, notify the personal data breach to the supervisory authority competent in accordance with Article 55, unless the personal data breach is unlikely to result in a risk to the rights and freedoms of natural persons. Where the notification to the supervisory authority is not made within 72 hours, it shall be accompanied by reasons for the delay.
2. The processor shall notify the controller without undue delay after becoming aware of a personal data breach.

The above can be codified in the system 302, using the authority module 306, as the tasks 602-604. The task 602 corresponds to the first requirement of the Article 33 section 1, namely the first sentence "In the case of a personal data breach, the controller shall without undue delay and, where feasible, not later than 72 hours after having become aware of it, notify the personal data breach to the supervisory authority competent in accordance with Article 55, unless the personal data breach is unlikely to result in a risk to the rights and freedoms of natural persons." The task 604 corresponds to the second requirement of the Article 33 section 1, namely the second sentence "Where the notification to the supervisory authority is not made within 72 hours, it shall be accompanied by reasons for the delay." The task 606 corresponds to the only requirement of the Article 33 section 2, namely that "The processor shall notify the controller without undue delay after becoming aware of a personal data breach."

Additional details can be associated with each codified task (e.g., the tasks 602-606). In an example, the tasks module 310 can be used to associated details with tasks. For example, a task-details interface 614, which can be displayed when a user interface control 612 that is associated with the task 602 is initiated, indicates which teams 618 (i.e., user groups) are responsible for performing (e.g., resolving, responding to, executing, carrying out, etc.) the task 602 in response to a cyber event that is of a type that is listed in the attribute 556 of FIG. 5B, affects data that are classified as specified by the attribute 558 of FIG. 5B, is of a type as indicated by the attribute 560 of FIG. 5B, implicates the country and/or state as indicated by the attributes 562 and 564, respectively, or a combination thereof. Namely the user groups that are responsible for performing the task 602 are listed as the "Privacy," "Communications," "Generate Counsel," and "Outside counsel" user groups. That is, at least one user from each of the teams listed in the teams 618 is responsible for the completion of the task 602. Alternatively, at least one user from at least one of the teams listed in the teams 618 is responsible for the completion of the task 602.

As another example, a task-details interface 620 that is associated with the task 604 indicates that teams 622 (i.e., user groups) are responsible for performing the task 604. Namely the user groups that are responsible for performing the task 604 are listed as the "Privacy," "Communications," "Generate Counsel," and "Outside counsel" user groups.

Figure 7A:
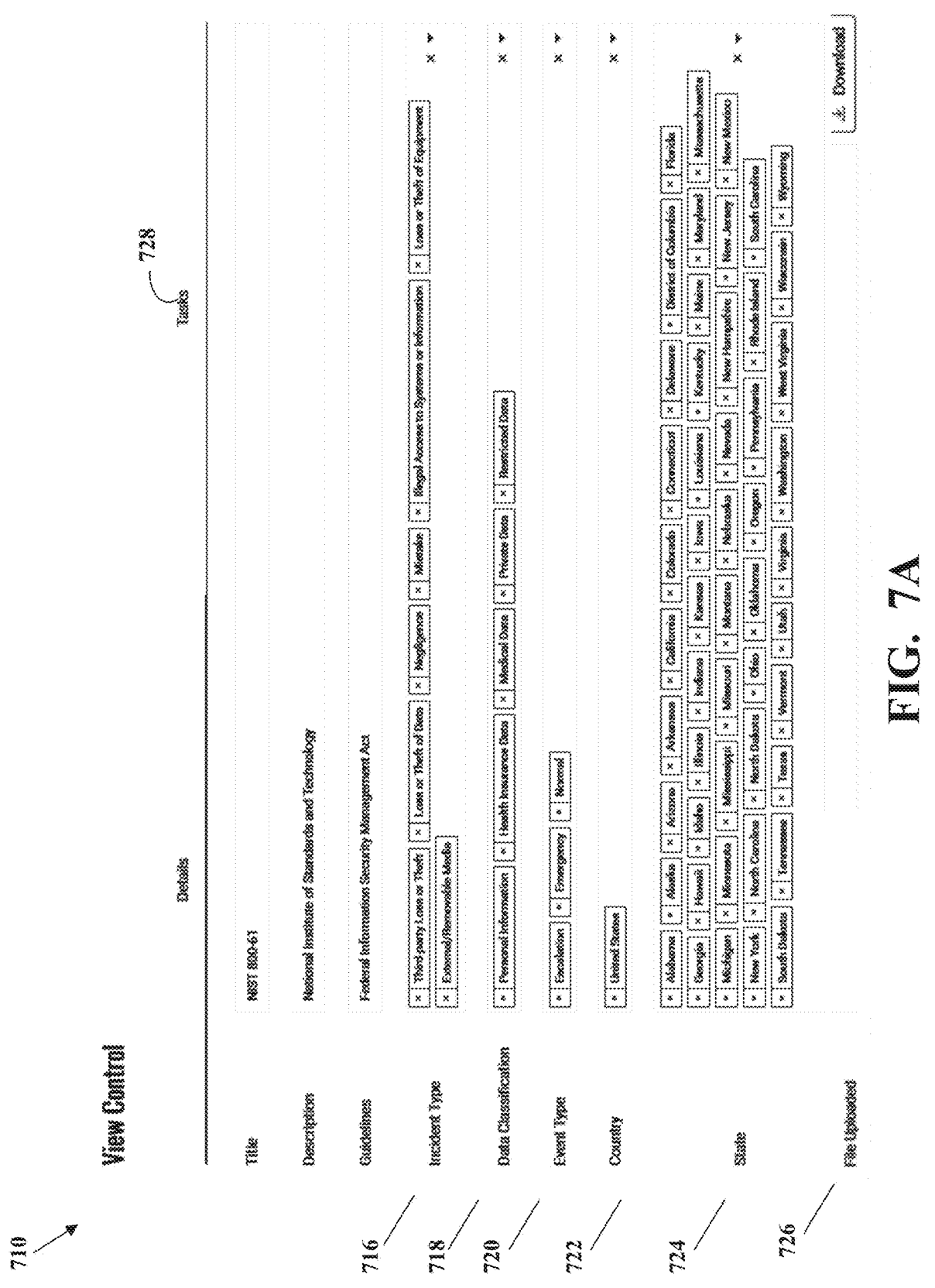
Figure 7B:
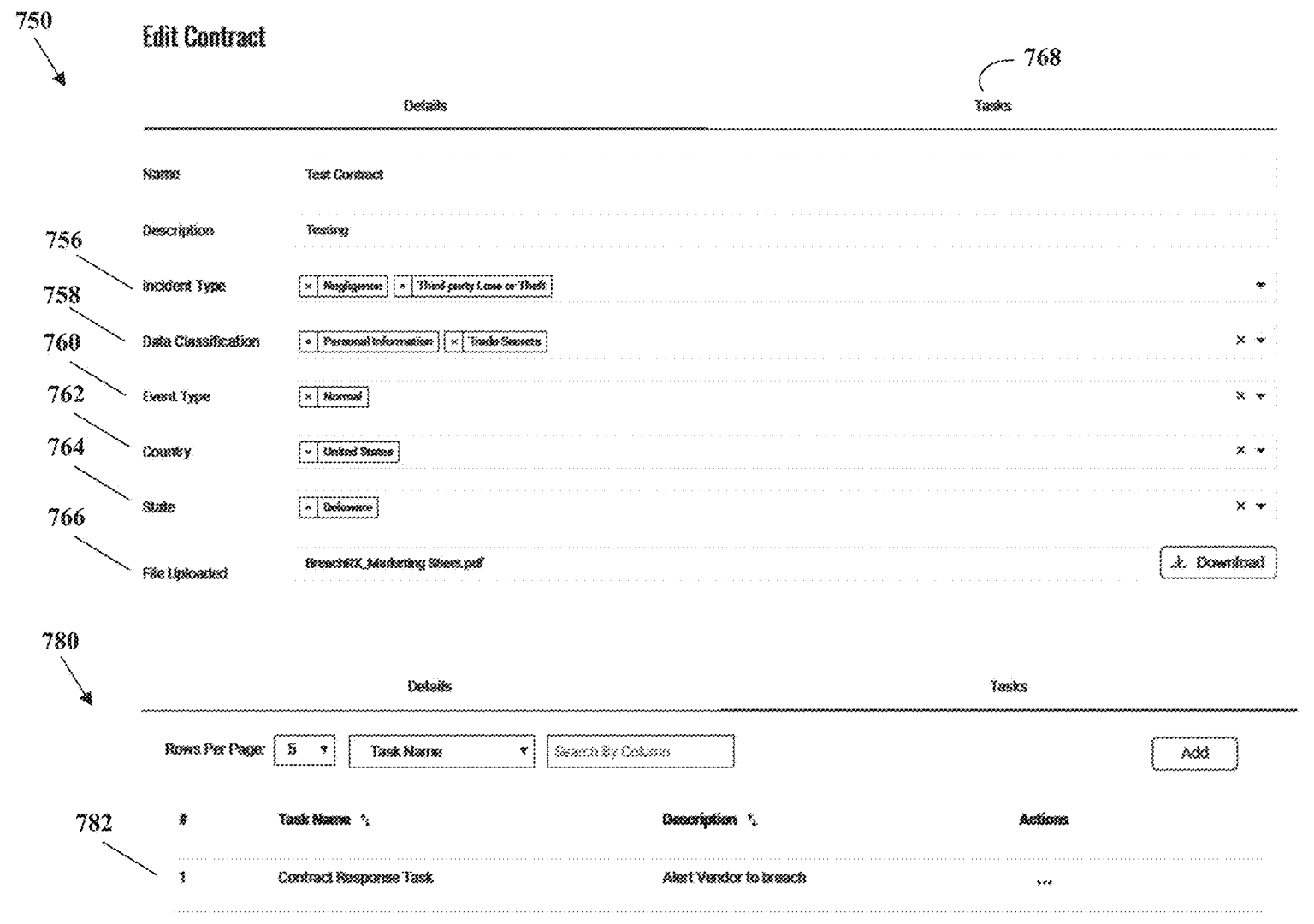

FIGS. 7A-7B are illustrations of user interfaces of details of other authorities according to implementations of this disclosure.

As mentioned above, an authority can be a control (such as an IT control). A control details 710 user interface illustrates the details of the NIST 800-61, which is referred to above. The control details 710 illustrates that a control can have attributes that are similar to those of regulations. For example, attributes 716-726 can be similar (e.g., can have the same semantics and values) as the attributes 516-526 as described with respect to FIG. 5A. However, a control can have more, fewer, or other attributes than a regulation. Tasks can also be associated with a control. The tasks associated with a control can be as described with respect the tasks of the listing 600. The control details 710 includes a user interface 728, which can be as described with respect to the user interface control 568 of FIG. 5B.

As also mentioned above, an authority can be a contract. A contract details 750 user interface illustrates the details of a contract titled "Test Contract." The contract details 750 illustrates that a contract can have attributes that are similar to those of regulations and/or controls. For example, attributes 756-766 can be similar (e.g., can have the same semantics and values) as the attributes 516-526 as described with respect to FIG. 5A. However, a contract can have more, fewer, or other attributes than a regulation or a control. Tasks can also be associated with a contract. The tasks associated with a contract can be as described with respect the tasks of the listing 600. The contract details 750 includes a user interface control 768, which can be as described with respect to the user interface control 568 of FIG. 5B. When the user interface control 768 is invoked, a listing 780 can be displayed. The listing 780 illustrates that a task 782 (with a description of "Alert Vendor of breach") is to be performed in the case that the instant enterprise is subjected to (e.g., experiences) a data breach. The task 782 can be a contractual obligation that the instant enterprise has to the vendor that is the other party of the contract.

Returning again to FIG. 3, the example 300 illustrates that the system 302 (or modules thereof) can be in communication with zero or more CMDB systems (i.e., a CMDB 320), zero or more procurement systems (i.e., a procurement 322), zero or more intelligence feed systems (i.e., an intel feed 324), zero or more Security Information Event Management systems (i.e., a SIEM 326), zero or more change management systems (i.e., a change management system 328), and/or zero or more source code repository systems (i.e., a source code 330). Examples of procurement systems include SAP ERP, Oracle Procurement, and IBM Emptoris. Examples of change management systems include ServiceNow, BMC remedy, and Hewlett-Packard Service Anywhere. Examples of configuration management systems include ServiceNow, Puppet, Chef, Ansible, BladeLogic, and Microsoft SCCM. Examples of SIEM systems include Splunk, ELK, and LogRhythm. Other systems that the system 302 can be in communication with include record management systems, such as IBM Filenet, Hyland OnBase, EMC Documentum, Opentext ECM, or the like. Examples of source code repository systems include GitHub, Bitbucket and SourceForge. The system 302 can be in communication with other systems such as a credential stores (e.g., Windows Security Accounts Manager, Linux "/etc/shadow," and Amazon Web Services (AWS) Secrets Manager) for authentication protocols such as Linux PAM (pluggable authentication modules), RADIUS, TACACS, SAMLE, LDAP, oAuth, Kerberos, or other authentication protocols.

The system 302 can use procurement data, change management data, records management data, configuration management data, security incident and event management data, additional data, fewer data, or other data to perform an assessment of such data; determine, based on or using the data, security risks in the context of jurisdictional requirements (for example, as further described below with respect to the authority module 306); and, in response to identifying a security threat, manage the response through a collection (e.g., a playbook) of actions (e.g., tasks) that involve directing changes on endpoint systems/servers/applications/etc. (e.g., configuration items) of a company employing the system 302. The endpoints can be on-premise, cloud-based, networked, or otherwise deployed endpoints.

The CMDB 320 can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer, the application server 112, the application node 114, the database server 116, the database 118, or any other element, portion of an element, or combination of elements of the system 100 can be represented in the CMDB by one or more respective CIs. The CMDB 320 can include information describing the configuration, the role, or both the configuration and the role, of an element of the system 100. In an example, the CMDB 320 can include a CI that represents a database (e.g., an Oracle database). The CI includes information regarding the database. For example, the information regarding the database can include that the database is physically located on a server in New York City, and that the database include financial information regarding clients and client PII information (such as client names, social security numbers, and asset information per client).

The procurement 322 can include features including supplier management, sourcing, requisitioning, purchasing, and payments. The procurement 322 can also include contract management. As such, the procurement 322 can include documents or records regrading contractual obligations. Such contractual obligations can be related to cyber events. As such, by receiving the documents and/or records regarding the contractual obligations, the system 302 can codify and/or can be used to codify contractual obligations related to cyber events of the instant enterprise. In an example, the contract document can be searched for terms such as GDPR, extract sentences that include the verbs "will," "shall," "must," "should," any variants thereof, or other terms and codify such sentences into the system 302. In an example, the contract can be parsed to identify the required control sets that the instant enterprise must have in place. The required control sets can include preventive controls, requirements for disclosure of a breach, requirements for remediation of a breach, other controls, or combination thereof.

In an example, the system 302 can deconstruct the contract language; map the contract language to other codified requirement (such as codified regulations); determine what controls (e.g., IT controls) should be in place; and match controls against configuration management information. For example, if asset information received from a configuration management system does not satisfy the required controls, then the system 302 can identify such assets, report the assets, and/or created incidents with respect to these assets.

For example, when a new contract agreement becomes active in the procurement 322, the system 302 (or a component thereof) can scan the agreement to determine the jurisdictions that require coverage (e.g., in terms of cyber event monitoring and response) and, e.g., the playbooks. Playbooks and/or tasks can be (e.g., automatically or manually) added, deleted, or changed to provide the contract-required coverage for breach incident responses and reporting for the jurisdiction.

In an implementation, an authority (e.g., a contract, a regulation, etc.) can have an effective date. The effective date can be the date that the authority becomes active or is in full force. As such, in some implementations, a task for responding to an incident of an authority that is not yet active may not be triggered (e.g., initiated, assigned to a user group, etc.) unless the incident date (e.g., date of occurrence of the incident) is on or after the effective date of the authority.

In an implementation, the system 302 can maintain versions of the same authority. For example, a first version of a contract may be effective on Jan. 2, 2018 and a second version of the contract, which amends the first version, may be effective on Sep. 15, 2018. The system 302 can, and/or can provide facilities or tools to, identify differences between two (e.g., versions of) authorities and update playbooks based on the differences. In an example, updating playbooks can include creating a new playbook from an existing playbook such that the new playbook reflects the differences in the authorities. The updated playbooks can included additions, deletions, or edits to the tasks of the original playbook.

For example, assume that a first playbook (K1 PB) of a first version of a contract includes a first task (K1 T1), a second task (K1 T2), and a third task (K1 T3). The first task (K1 T1) is included in the playbooks of a first incident type (I1 PB) and a second incident type (I2 PB), the second task (K1 T2) is included in the playbook of the second incident type (I2 PB); and the third task (K1 T3) is included in the playbook of the first incident type (I1 PB). The contract is now revised to a second version resulting in a second playbook (K1' PB). The second playbook can be a version of the first playbook (K1 PB).

Based on identifying differences (e.g., textual differences) between the first version and the second version of the contact, it may be determined that (K1 T1) is no longer applicable to the second version of the contact and, as such, it should be removed. Accordingly updated versions of first and the second incident types playbooks (I1' PB and I2' PB) are updated to remove K1 T1; it may be determined that the second task (K1 T2) is to be updated to (K1' T2'); and it may be determined that a new task (K1' T4) is to be added and further that (K1' T4) should be added to the updated playbook of the first incident type. Such changes can be made to the existing playbooks without having to create new playbooks from scratch. Table I illustrates which tasks are associated with which playbooks (I1 PB) and (I2 PB) at identified based on the first version of the contact. Table II illustrates which tasks are associated with the updated playbooks (I1' PB) and (I2' PB), which may be versions of the playbooks (I1 PB) and (I2 PB), based on the second version of the contract.

TABLE I

|  | I1 PB | I2 PB |
| --- | --- | --- |
| K1 T1 | X | X |
| K1 T2 |  | X |
| K1 T3 | X |  |

TABLE II

|  | I1'PB | I2'PB |
| --- | --- | --- |
| K1 T1 |  |  |
| K1'T2' |  | X |
| K1 T3 | X |  |
| K1'T4 | X |  |

The intel feed 324 can be an incoming stream of information related to potential or current threats (i.e., cyber events) that the system 302 is managing or is configured to identify and manage. As such, in an implementation, the system 302 may be configured to receive intelligence items from the intel feed 324. One or more modules of the system 302, such as an intel feed module (not shown) can process the intelligence items and associate at least some of the intelligence items with security incidents, tasks, or other information that are currently active (e.g., being mitigated, monitored, or the like) in the system 302 (i.e., by at least one module of the system 302). In an implementation, the system 302, or a module thereof, can crawl the intel feed 324 to extract the intelligence items. In an implementation, the system 302 can subscribe to receive intelligence items from the intel feed 324.

An illustration of using the intel feed 324 is now provided. A cyber event related to an email system has been identified and a playbook (as further described below) is being executed to respond to (e.g., resolve, mitigate, etc.) the cyber event. In the process of carrying out the response (e.g., executing the tasks of the playbook) to the cyber event, a task may be assigned to a user of the users/groups module 304. The system 302 can automatically identify for the user any intel items (e.g., stories, resolution techniques, mitigation techniques, etc.) from intel feeds related to the cyber event and the email system. As such, the user can leverage industry-wide (e.g., internet-wide and/or, more specifically, cyber-security-industry wide) knowledge regarding the cyber event thereby enabling the user to more efficiently and expeditiously resolve (e.g., respond to) the cyber event and complete the task. In an example, the relevant item items can be presented to the user in a user interface that is related to the task that is assigned to the user. In an example, a relevant intel item may be presented to the user as a hyperlink, which, when clicked (e.g., selected) by the user, can navigate the user to a full description of the intel item.

In an implementation, the system 302 can receive (e.g., in real-time, in near real-time, on a scheduled basis, by pull, etc.), from the STEM 326, analysis of security alerts generated by applications and network hardware. In an example, the system 302 can receive aggregated log data, correlated data, alerts based on analysis of aggregated and/or correlated data, more or fewer data types, or a combination thereof from the STEM 326.

In an example, the SIEM 326 system can programmatically create (such as via an API of the system 302) an incident in the system 302. In an example, the SIEM 326 can specify the name of a playbook and/or other values for attributes of the incident. The programmatically created incident can be accessed and worked on (such as by completing tasks) by users of the system 302. In another example, a programmatically created incident by the SIEM 326 can cause the system 302 to automatically create a request (e.g., a ticket) in the CMDB 320, the change management system 328, or some system.

An illustration of using the SIEM 326 is now provided. The system 302 (or a module thereof) can receive an event from the SIEM 326, indicating, for example, that data was extracted (e.g., such as via a SQL query) from a database and that the request to extract the data was initiated from a certain Internet Protocol (IP) address. The event may include additional information regarding the database. Such information can be used by the system 302 to determine whether security controls are associated with the database.

In an example, the system 302 can query the CMDB 320 to determine whether the database is configured for encryption. This is so because a control may be that "personally identifiable information must be encrypted at rest." In another example, whether the database is configured for encryption may be information that is already available to the system 302. If the database is configured for encryption, then the extracted data may be in encrypted format and no serious breach may be considered to have occurred. If the database is determined to not be configured for encryption, then, via the system 302, an incident may be initiated whereby a task can be assigned to the Operator group, which may be set in the system 302 as the user group assigned to the control. For example, the system 302 (or a component thereof) can cause a request (e.g., a support ticket) to be created, for the operator group, in a configuration management system, a change management system, and/or some other system through which tasks can be assigned. The system 302 can receive from such a system an identifier (e.g., a ticket number, a link, etc.) for the created request. The system 302 can also report that the database does not employ encryption in violation of GDPR.

If the system 302 cannot determine whether the database is encrypted, and if the IP address is outside the range of IPs of the instant enterprise, then the system 302 can determine that unencrypted PII data was moved outside the instant enterprise in violation of GDPR. As such, the system 302 can initiate an incidence response, as further described below.

In another example, the system 302 can scan and assess events that are received from the SIEM 326 to determine an updated risk to the instant enterprise of a cyber event. Playbooks and/or tasks can be added, deleted, and/or changed, by one or more components of the system 302, to reflect the updated risk. The system 302 can report changes to risk score of the instant enterprise based on the changes.

An illustration of using the change management system 328 is now provided. Assume that a server is currently configured with an operating system named Lido, version 10. Assume further that a planned upgrade to version 12 is approved in the change management system 328. The system 302 can receive a notification (e.g., an automated notification) of the change. However, based on information received from the intel feed 324, the system 302 includes information regarding known vulnerability of Lido version 12. As such, the system 302 can initiate an incident related to the planned upgrade and/or initiate a notification related to the vulnerability.

An example of using configuration management data from a configuration management system is now provided. Configuration management data can be extracted (e.g., received) from a configuration management system so that the system 302 can perform back testing. Back testing can entail examining how configurations change over time. The changes over time (or at least the most recent and unexamined configuration change) can be compared to an expected security posture. For example, if a change indicates that a firewall setting on an asset (such as a server) of the instant enterprise is changed such that the asset can receive request from outside the enterprise, then a playbook to remediate that vulnerability can be initiated.

In another example, source code from a source code control repository, such as the source code 330 of FIG. 3, can be examined to determine security vulnerabilities. The system 302 can include an interpreter (i.e., a source code analyzer) that can analyze for security vulnerabilities in the source code and/or data that results from the interpreting of the source code. In an example, statistical analysis can be performed on the source code to identify vulnerabilities. The source code analyzer can leverage machine learning tools to combine the source repository along with asset configurations such as policies and network configurations (when available) to determine security vulnerabilities.

Figure 8:
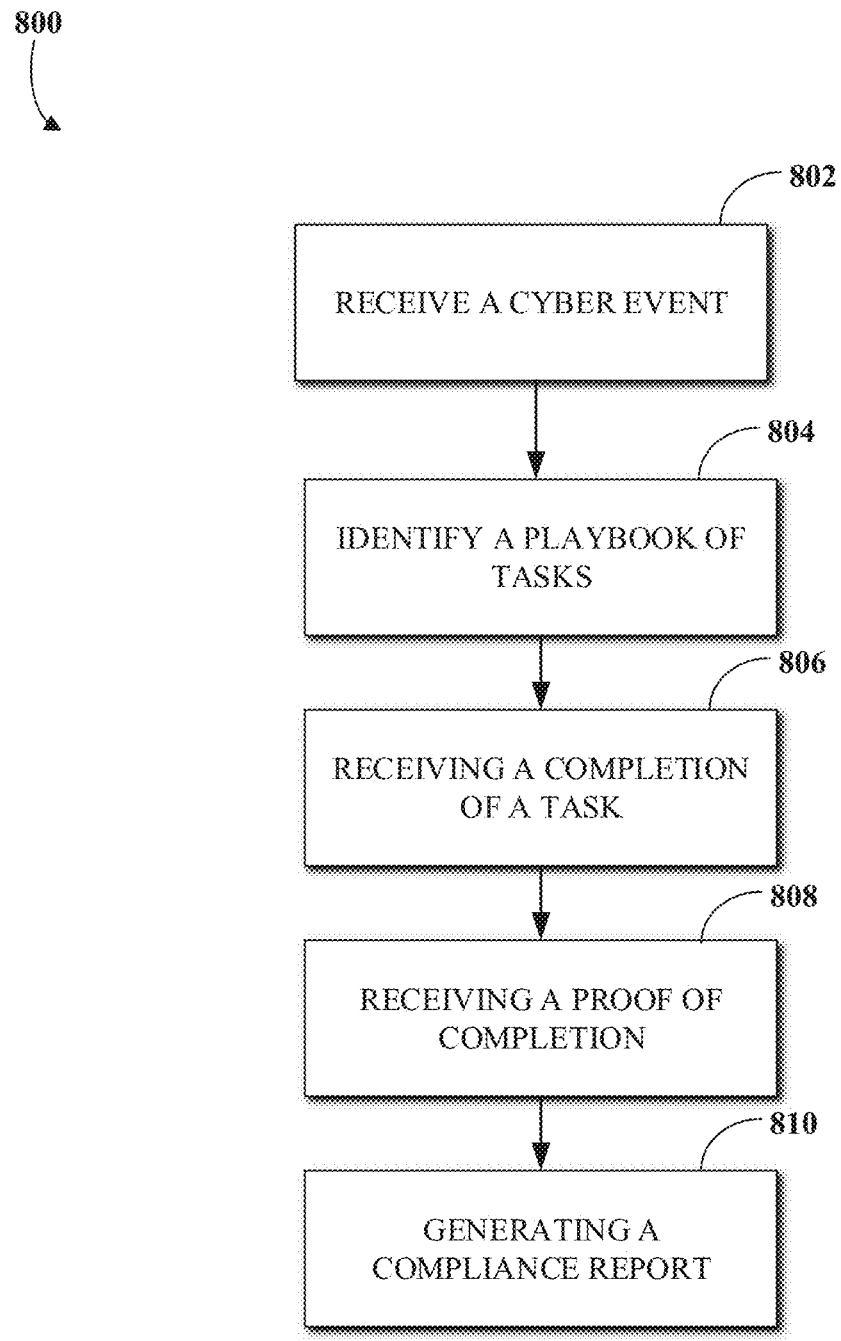
FIG. 8 is an example of a process for responding to cyber events according to implementations of this disclosure.

FIG. 8 is an example of a process 800 for responding to cyber events according to implementations of this disclosure. The process 800 can be performed by a system, such as the system 302 of FIG. 3. The process 800 can be stored as executable instructions in a memory, such as the memory 206 and/or the executable instructions 208 of FIG. 2. The process 800 can be used to, in the case that a cyber event occurs, respond to (e.g., manage, resolve, communicate about, etc.) as mandated (e.g., required, suggested, recommended, proscribed, etc.) by an authority.

In an implementation, commonly occurring, anticipated, foreseeable, and/or subject to authority (e.g., regulations) cyber events (collectively, common incidents) may be pre-configured. More specifically, responses to such commonly occurring or anticipated cyber events can be pre-configured in the system. Pre-configuration of responses in the system can ensure that the instant enterprise has worked through the most appropriate responses and the set of tasks required to respond to such events.

Figure 9:
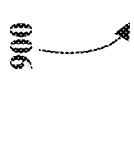
FIG. 9 is an illustration of a user interface of common incidents according to implementations of this disclosure.

FIG. 9 is an illustration of a user interface of common incidents 900 according to implementations of this disclosure. The common incidents 900 shows that the instant enterprise has pre-configured responses to five common incidents, including a common incident 902 and a common incident 904. That is, the instant enterprise has preconfigured responses to these common incidents. Each preconfigured response includes a set of tasks. As mentioned above, a task can be assigned to one or more user groups.

The common incident 902 can codify the tasks to be completed when the instant enterprise is breached (e.g., hacked). The common incident 902 is named "NYDFS Playbook." The common incident 904 codifies the tasks to be completed when a cyber event affecting consumer data of a European Union member state is affected. The common incident 904 is named "GDPR Playbook." Playbooks codify what the instant enterprise has to do to comply with the regulations, the controls (e.g., IT controls), the internal company policies, the contractual relationships and/or contractual obligations, and/or any other authority as related to cyber events.

The playbooks can be tailored (e.g., created, configured, customized, etc.) to the specific circumstances of the instant enterprise and an incident type. For example, if the instant enterprise is a New York-based enterprise and also serves customers in at least some European Union member states, then a playbook related to data breach can include tasks related to both GDPR and NYDFS. The playbooks can be tailored to the types of events. For example, different tasks may be executed in cases of PII data loss that is due to theft by an employee versus PII data loss that is due to an external hack.

Figure 10:
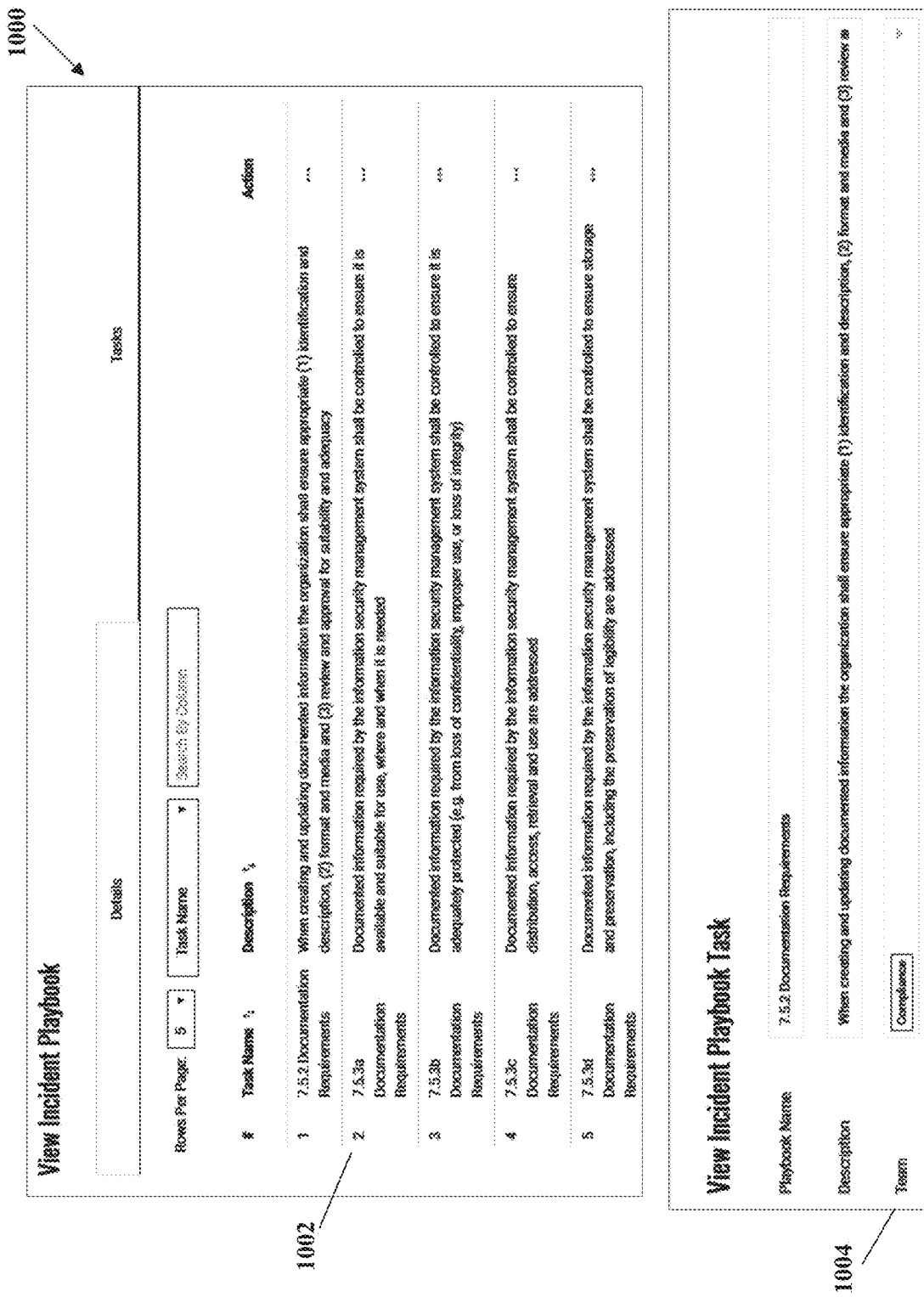
FIG. 10 is an illustration of a user interface of tasks of a playbook according to implementations of this disclosure.

FIG. 10 is an illustration of a user interface of tasks 1000 of a playbook according to implementations of this disclosure. The tasks 1000 illustrate an example of tasks that are associated with a playbook that are related to the ISO 2001 version 2015 standard. In the scope section of the ISO 2001 standard, the standard states: "This International Standard specifies requirements of a quality management system when an organization a) needs to demonstrate its ability to consistently provide products and services that meet customer and applicable statutory and regulatory requirements, and b) aims to enhance customer satisfaction through the effective application of the system, including processes for improvement of the system and the assurance of conformity to customer and applicable statutory and regulatory requirements." The tasks 1000 more specifically relate to section "7.5.2. Creating and updating [Documented information]" of the standard.

As mentioned above, a playbook can be associated with a cyber event. The cyber event in the example of FIG. 10 can be the regular execution of an ISO 2001 playbook to ensure that documentation requirements of the instant enterprise remain compliant with "applicable statutory and regulatory requirements." The tasks 1000 includes a task 1002. The task 1002 is assigned to a user group 1004; namely, the "Compliance" group.

At 802, the process 800 receives a cyber event. 'The cyber event can be at least one of a (real) breach event, a simulation event, or a mitigation event. For example, so that the instant enterprise can test its readiness or completeness of response to a real cyber event, the process 800 can be used to simulate the cyber event by causing the event to be received. In an example, results of the performance of the process 800 can cause the adjustments to a playbook (such as by adding or modifying one or more tasks).

In an example, the cyber event can be received when a user selects a playbook to execute from a list of available playbooks, such as described with respect to FIG. 9. Selecting a playbook can include creating an incident that is pre-configured with a playbook.

In another example, the cyber event can be received from an external system. The external system can be any system that the system 302 communicates with as described with respect to FIG. 3. For example, an event (a trigger, a ticket, etc.) may be received from the CMDB 320 such that the event causes the common incident 904 to be initiated (e.g., instantiated). As such, the cyber event can be received from at least one of a configuration management system, a change management system, a records management system, or a security information and event management system.

In an example, and as described above with respect to intelligence feeds, receiving the cyber event can include receiving an intelligence feed; identifying an asset in a configuration management database based on the intelligence feed; and identifying the cyber event based on the asset.

In an example, receiving the cyber event can include receiving, from a configuration management system, asset information for an asset; identifying, using at least one of the asset information or the asset, a violated policy; and identifying the cyber event in response to identifying the violated policy.

At 804, the process 800 can identify a playbook of tasks. The playbook constitutes a response to the cyber event. As mentioned above, each task of the tasks is assignable to a user group. For example, and continuing from the above example, the event from the CMDB 320 causes the tasks (i.e., the playbook) associated with the common incident 904 to be instantiated and assigned to the respective teams (e.g., user groups). For example, the event received from the CMDB 320 can indicate the assets (e.g., servers, applications, etc.) that experienced (e.g., are affected by) the incident (e.g., the event). Information regarding the affected assets can be used to determine the playbook to be instantiated. For example, the process 800 can access information regarding the asset to determine that the asset manages data from European users. As mentioned above, a task can be assigned to an automated agent. As such, the user can be the automated agent. As such, the user can be a human user or an automated agent.

FIG. 11 is an illustration of a user interface of pending tasks 1100 according to implementations of this disclosure. The pending tasks 1100 displays a list of tasks that a current user (i.e., a user that is viewing the user interface of FIG. 11) can view and/or accept. The current user can accept a task if the user current is a member of a user group to which the task is assigned. In an example, to accept a task, the current user can select an accept 1102 menu action associated with the task. Selecting the accept 1102 menu item can cause a confirmation user interface 1104 to be invoked. In the confirmation user interface 1104, the current user can provide an intended start date 1106, an expected planned end date 1108, and an expected budget 1110 to complete the task. The intended start date 1106 can indicate when the current user intends to start work on the task. The expected planned end date 1108 can indicate when the current user expects to complete the task. The expected budget 1110 can be used to indicate any costs and/or expenditures associated with the task.

At 806, the process 800 can receive from a user, who has accepted a task, a completion indication of the task. In an example, a user interface control associated with a user interface of the task can include a button marked "Completed." Upon selecting the button, the task can be marked as completed by the process 800. In another example, even if the assigned user marks the task as completed, the task may not be considered completed by the process 800. Completing a task by a user may merely change the status of the task and cause the task to move in a workflow to a next user (e.g., a collaborating user, a reviewing user, etc.). A task may advance through several statuses until the process 800 can consider the task the be completed. At each status, the task may be assigned to different user groups.

At 808, the process 800 can receive a proof of completion of the task. In an example, upon completion of the task by the user, the process 800 can record a timestamp indicating the completion time and date of the task. In an example, the user can also provide proof of completion. For example, the user can associate with (e.g., upload to, attach to, etc.) the task one or more documents, which constitute a proof, a work product, a result, or the like that the user completed the task.

At 810, the process 800 can generate a compliance report. The compliance report can include all information available to the process 800 and which pertain to the tasks of the playbook identified for the cyber event. In an example, the compliance report can be or can be a basis for a final compliance report that is mandated to be provided to a regulatory agency.

In an example, the compliance report can include the assets that were compromised (if any), the chronology of events related to the incident, the classifications of the affected data, one or more of the tasks of the playbook, the list of users who completed each task, completion timestamps of the tasks, or the associated proofs.

In an example, the process 800 can generate the compliance report from a template, such as a document template, for an official notification to the regulatory agency. As the playbook can include tasks assigned to, for example, technical as well as legal personnel, the compliance report can include both technical as well legal information. In an example, a compliance report can include information such as "Server X, located at 4568 Main Street, Suite 10, Anyville, USA 12345, was taken offline on 3/4/2019 at 12:00:56 by the system administrator Joe Black; the backup dated Dec. 12, 2018 was restored the server on 3/5/2019 at 2:20:26; Bill Jobs, COO, notified Jim Jones, COO at Vendor XYZ, of the action on 3/5/2019 at 4:20:4."

In an example, the process 800 can further include receiving an intelligence feed and associating an intelligence report, from the intelligence feed, with at least one of the playbook of a task of the playbook.

Artificial intelligence and/or machine learning can be used to provide predictions regarding the likelihood and/or impact of future cyber events. The predictions can be based on at least one of back testing of past events using statistical modeling, neural networks, support vector machines, other modeling techniques, or a combination thereof. In an example, predictions can be used to assist cyber insurance providers in assessing the cyber security risks of current or potential insured enterprises. Over time, historical data can be used to predict how certain events translate into costs for an enterprise, and through the enterprise, to costs for its insurance provider. Additionally, systems and methods according to implementations of this disclosure can collect information and provide predictions and insights regarding how systems and types of cyber protections can impact the frequency and damage from various cyber events. For example, such predictions and insights can be generated based on analyses (such as before and after cyber events) of configurations of assets of enterprises as managed in CMDBs, change management systems, and other such systems.

Figure 12:
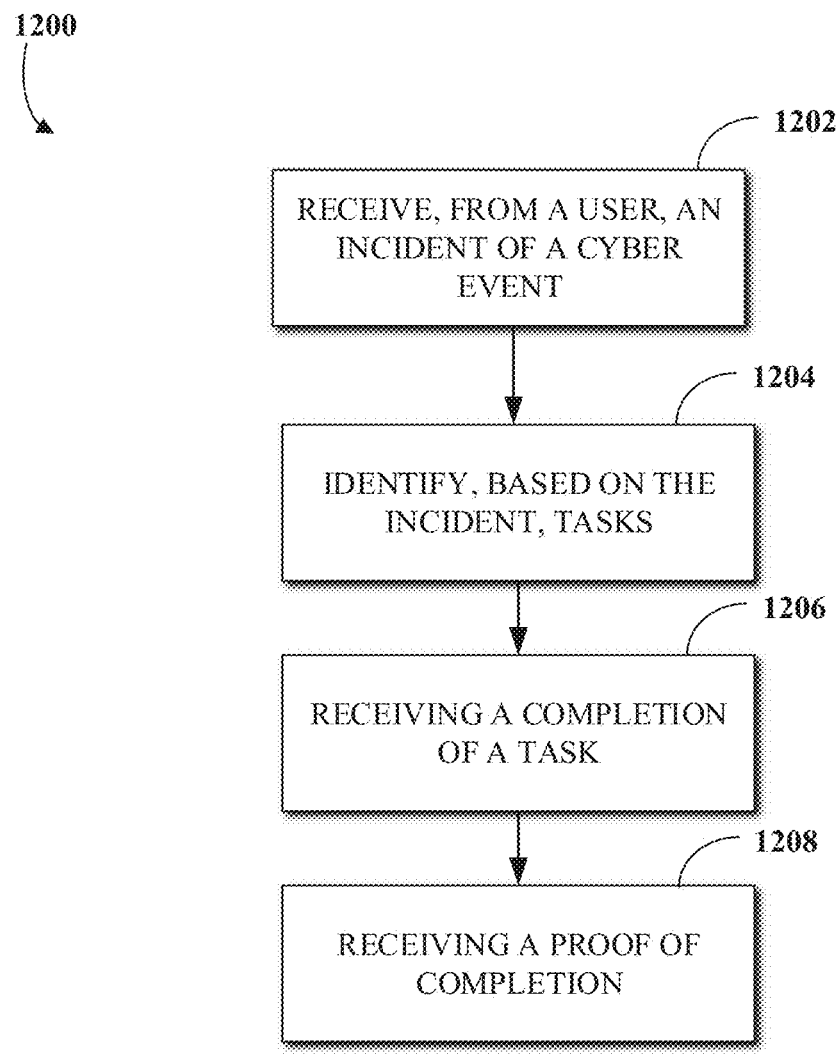
FIG. 12 is an example of a process for responding to cyber events according to implementations of this disclosure.

FIG. 12 is an example of a process 1200 for responding to cyber events according to implementations of this disclosure. The process 1200 can be performed by a system, such as the system 302 of FIG. 3. The process 1200 can be stored as executable instructions in a memory, such as the memory 206 and/or the executable instructions 208 of FIG. 2. The process 1200 can be used to, in the case that a cyber event occurs, respond to (e.g., manage, resolve, communicate about, etc.) as mandated (e.g., required, suggested, recommended, proscribed, etc.) by an authority.

At 1202, the process 1200 receives an incident of a cyber event. The incident can be received from a user. The user can be a human user or an external system. At 1204, the process 1200 identifies tasks based on the incident. For example, the process 1200 can identify the tasks based on attribute values of the incident. As mentioned above, each task of the tasks can be assignable to a user group.

In the case of an external system, the system 302 can provide a public API through which the external system can create the incident. An example of the external system can be the SIEM 326, the CMDB 320, or the change management system 328. For example, through the public API, the external system can send information that the system 302 can use to create the incident in the system 302. For example, the information can include an incident name, a description, an IP address of an affected asset, a media access control (MAC) address of the asset, fewer, more, other information, or a subset thereof.

Figure 13B:
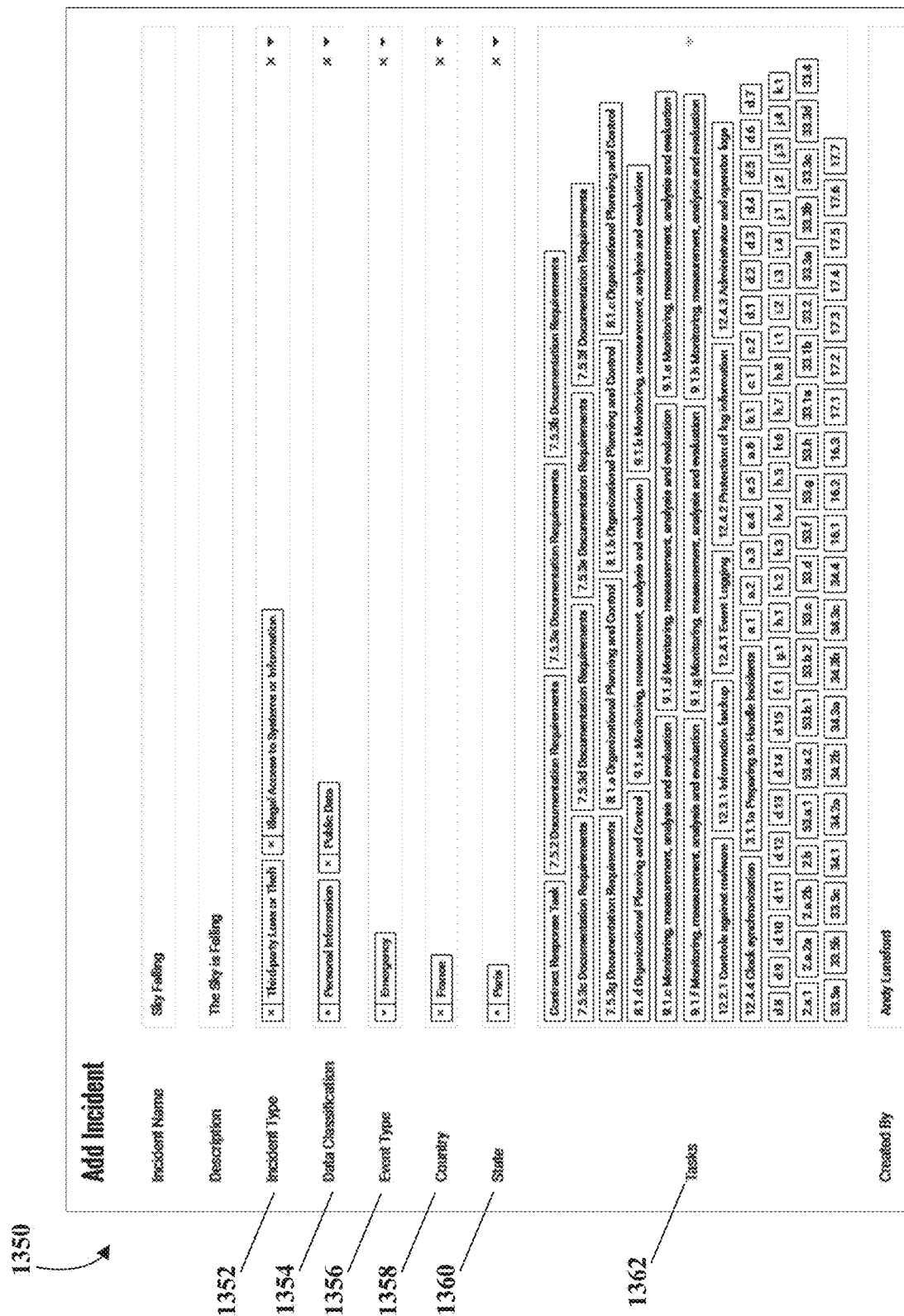

In the case of a human user, the system 302 can provide a user interface, such as user interfaces 1300 and 1350 of FIGS. 13A and 13B, respectively. FIG. 13A is an illustration of the user interface 1300 for creating an incident according to implementations of this disclosure. As the user provides values for some attributes of the incident to be created, the process 1200 can populate the tasks that are required to resolve and/or respond to the incident. The user interface 1300 illustrates attributes 1302-1310. The attribute 1302 indicates the incident type(s), the attribute 1304 indicates the data classification(s) of the data impacted by the incident, the attribute 1306 indicates the event type(s) of the incident, the attribute 1308 indicates the country(ies) where the incident has occurred, the attribute 1310 indicates the state(s) where the incident has occurred.

In an example, a task can be associated with at least one of a particular incident type, a type of data (i.e., a data classification), a particular event type, a specific country, a specific state, other attribute values, or a combination thereof. As such, when the particular attribute value (or a combination thereof) is selected by the user, when using the user interface 1300 to create or modify an incident, then the associated task can be automatically added to the incident.

The user interface 1300 illustrates that the task "ISO Task" is added to a tasks list 1312 upon the user selecting the combination of attribute values "Negligence" (for the attribute 1302), "Personal Information" (for the attribute 1304), "Emergency" (for the attribute 1306), "Afghanistan" (for the attribute 1308), and "Badakhshan" (for the attribute 1310). Contrastingly, the user interface 1350 illustrates that many other tasks are added to a task list 1362 upon the user selecting "Third Party Loss or Theft" and "Illegal Access to System or Information" for incident type (i.e., an attribute 1352), "Personal Information" and "Public Data" for data classification (i.e., an attribute 1354), "Emergency" as the event type (i.e., an attribute 1356), "France" for country (i.e., an attribute 1358), and "Paris" for state (i.e., an attribute 1360).

In an example, the attribute values can be used to identify a violated authority and the violated authority can in turn be used to identify the tasks. As such, identifying, based on the incident, the tasks can include determining a violated authority based on the incident (e.g., one or more of the incident attributes) and identifying the tasks based on the violated authority.

At 1206, the process 1200 receives, from a user of the user group, a completion of the task, as described with respect to the process 800. At 1208, the process 1200 can receive a proof of completion of the task, as described above with respect to the process 800.

In an example, the process 1200 can further include, as described above, receiving a first document constituting an authority; creating one or more playbooks of tasks based on the first document; receiving an second document constituting a revision of the authority; identifying differences between the first document and the second document; and based on the differences, updating at least one of the one or more playbooks of tasks.

In some implementations, the system 302 (or a component thereof) can perform trend analysis with respect to vulnerabilities, incidents, and other data accumulated by the system 302 to perform predictive analytics to predict the timing and nature of a future breach.

For simplicity of explanation, the processes 800 and 1200 are depicted and described as a series of steps. However, steps in accordance with this disclosure can occur in various orders, concurrently, and/or iteratively. Additionally, steps in accordance with this disclosure may occur with other steps not presented and described herein. Furthermore, not all illustrated steps may be required to implement a technique in accordance with the disclosed subject matter.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The above-described implementations have been described in order to allow easy understanding of the present disclosure and do not limit the present disclosure. To the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    creating a playbook of tasks based on a first document constituting an authority, the authority defining requirements for responding to cyber event incidents, wherein at least some of the tasks are completed in response to incidents, and wherein the playbook is associated with an incident type;
    creating a new version of the playbook based on differences between the first document and a second document constituting a revision of the authority, wherein the new version of the playbook is associated with the incident type, and wherein creating the new version of the playbook comprises:
        determining whether the authority requires a first task of the playbook,
        responsive to determining that the first task is not required by the authority, removing the first task of the playbook from the new version,
        determining whether the authority requires an update to a second task of the playbook,
        responsive to determining that the authority requires the update to the second task, adding an updated task of the second task of the playbook to the new version of the playbook, and
        determining whether the authority requires a third task that is not included in the playbook,
        responsive to determining that the authority requires the third task, adding the third task to the new version of the playbook;
    receiving a first incident;
    determining that the first incident is of the incident type; and
    responsive to determining that the first incident is of the incident type, using the new version of the playbook to respond to the first incident, wherein using the new version of the playbook to respond to the first incident comprises:
        selecting, based on data associated with the first incident, at least a subset of tasks of the new version of the playbook for resolving the first incident.

2. The method of claim 1, wherein the second document has a second effective date that is later than a first effective date of the first document.

3. The method of claim 2, wherein responsive to receiving a second incident before the second effective date and after creating the new version of the playbook, using the playbook to respond to the second incident.

4. The method of claim 1,
    wherein the playbook is further associated with a data classification and a jurisdiction,
    wherein the incident type is selected from a set of incident types including a first incident type of loss or theft of data and a second incident type of illegal access to systems or information and the data classification,
    wherein the data classification is selected from a set of data classifications including a first classification of personal information and a second classification of private data, and
    wherein the jurisdiction comprises at least one country or at least one state.

5. The method of claim 1, wherein using the new version of the playbook to respond to the first incident comprises:
    receiving, from a configuration management system comprising information regarding information technology items, configuration information of a configuration item of the information technology items;
    identifying, using the configuration information of the configuration item, a violation of the authority;
    identifying a cyber event in response to identifying the violation; and identifying the new version of the playbook to respond to the first incident.

6. The method of claim 1, wherein using the new version of the playbook to respond to the first incident comprises:
receiving an intelligence feed comprising information related to potential or current cyber events;
identifying a cyber event based on the intelligence feed;
creating the first incident for the cyber event; and
identifying the new version of the playbook to respond to the first incident.

7. The method of claim 1, wherein the authority is at least one of a law, a regulation, a contract, or an information technology control.

8. The method of claim 1, further comprising:
receiving an indication of a completion of a task;
receiving a proof of completion of the task; and
generating a compliance report that includes the task and the proof of the completion.

9. A device, comprising:
a memory; and
a processor, the processor configured to execute instructions stored in the memory to:
identify differences between a first document and a second document, the first document constituting an authority and the second document constituting a revision of the authority;
create a new version of a playbook based on differences between the first document and the second document, wherein the playbook corresponds to the first document and has a first effective date, wherein the new version has a second effective date, and wherein to create the new version of the playbook comprises to:
determine whether the revision of the authority requires a first task of the playbook;
responsive to determining that the first task is not required by the revision of the authority, remove the first task of the playbook from the new version of the playbook;
determine whether the revision of the authority requires an update to a second task of the playbook;
responsive to determining that the revision of the authority requires the update to the second task, add an updated task of the second task to the new version of the playbook; and
determining whether the revision of the authority requires a third task that is not included in the playbook;
responsive to determining that the revision of the authority requires the third task, add the third task to the new version of the playbook; and
responsive to receiving an incident before the second effective date and after creating the new version of the playbook, use the playbook to identify a set of tasks for resolving the incident.

10. The device of claim 9,
wherein the playbook is associated with an incident type, a data classification, and a jurisdiction,
wherein the incident type is selected from a set of incident types including a first incident type of loss or theft of data and a second incident type of illegal access to systems or information and the data classification,
wherein the data classification is selected from a set of data classifications including a first classification of personal information and a second classification of private data, and
wherein the jurisdiction comprises at least one country or at least one state.

11. The device of claim 9, wherein the incident is a first incident, and wherein the processor is further configured to execute instructions to:
responsive to receiving a second incident after the second effective date, use the new version of the playbook to respond to the second incident.

12. The device of claim 11, wherein to use the new version of the playbook to respond to the second incident comprises to:
receive, from a configuration management system comprising information regarding information technology items, configuration information of a configuration item of the information technology items;
identify, using the configuration information of the configuration item, a violation of the authority;
identify a cyber event in response to identifying the violation; and
identify the new version of the playbook to respond to the second incident.

13. The device of claim 9, wherein to use the new version of the playbook to respond to the incident comprises to:
receive an intelligence feed comprising information related to potential or current cyber events;
identify a cyber event based on the intelligence feed;
create the incident for the cyber event; and
identify the new version of the playbook to respond to the incident.

14. The device of claim 9, wherein the processor is further configured to execute instructions to:
receive a proof of completion of a task; and
generate a compliance report that includes the task and the proof of the completion.

15. The device of claim 9, wherein the authority is at least one of a law, a regulation, a contract, or an information technology control.

16. A non-transitory computer readable medium storing instructions operable to cause one or more processors to perform operations comprising:
identifying differences between a first document and a second document, the first document constituting an authority and the second document constituting a revision of the authority, wherein identifying the differences between the first document and the second document comprises:
determining whether the first document requires a task that is not required by the second document;
creating a new version of a playbook based on differences between the first document and the second document, wherein the playbook corresponds to the first document and has a first effective date, and wherein the new version of the playbook corresponds to the second document and has a second effective date that is later than the first effective date, wherein creating the new version of the playbook based on the differences comprises:
responsive to determining that the first document requires the task that is not required by the second document, removing the task from the new version of the playbook; and
responsive to receiving an incident after the second effective date, using the new version of the playbook to identify a set of tasks for resolving the incident.

17. The non-transitory computer readable medium of claim 16, wherein the playbook is associated with an incident type, a data classification and a jurisdiction, wherein the incident type is selected from a set of incident types including a first incident type of loss or theft of data and a second incident type of illegal access to systems or information and the data classification, wherein the data classification is selected from a set of data classifications including a first classification of personal information and a second classification of private data, and wherein the jurisdiction comprises at least one country or at least one state.

18. The non-transitory computer readable medium of claim 16, wherein the incident is a first incident, and wherein the operations further comprise:

responsive to receiving a second incident before the second effective date and after creating the new version of the playbook, using the playbook to respond to the second incident.

19. The non-transitory computer readable medium of claim 16, wherein using the new version of the playbook to respond to the incident comprises:

receiving, from a configuration management system comprising information regarding information technology items, configuration information of a configuration item of the information technology items;

identifying, using the configuration information of the configuration item, a violation of the authority;

identifying a cyber event in response to identifying the violation; and identifying the new version of the playbook to respond to the incident.

20. The non-transitory computer readable medium of claim 16, wherein using the new version of the playbook to respond to the incident comprises:

receiving an intelligence feed comprising information related to potential or current cyber events;

identifying a cyber event based on the intelligence feed;

creating the incident for the cyber event; and identifying the new version of the playbook to respond to the incident.

* * * * *